United States Patent
Chu et al.

(10) Patent No.: US 6,794,443 B2
(45) Date of Patent: Sep. 21, 2004

(54) HOT MELT ADHESIVE COMPOSITION

(75) Inventors: Wayne K Chu, Basking Ridge, NJ (US); Susan M Burdett, Slough (GB); David J Good, Somerville, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 16 days.

(21) Appl. No.: 10/367,543

(22) Filed: Feb. 14, 2003

(65) Prior Publication Data
US 2004/0162396 A1 Aug. 19, 2004

(51) Int. Cl.$^7$ .............................................. C08F 210/02
(52) U.S. Cl. ................ 524/563; 524/271; 524/487; 524/274; 525/330.3; 525/332.8; 525/333.3
(58) Field of Search ................. 524/563, 271, 524/487, 274; 525/330.3, 332.8, 333.3

(56) References Cited

U.S. PATENT DOCUMENTS

| | | | |
|---|---|---|---|
| 4,497,941 A | | 2/1985 | Aliani et al. |
| 5,373,049 A | | 12/1994 | Ornstern et al. |
| 5,670,566 A | * | 9/1997 | Liedermooy et al. ....... 524/271 |
| 6,117,945 A | * | 9/2000 | Mehaffy et al. ............ 525/159 |

* cited by examiner

*Primary Examiner*—David W. Wu
*Assistant Examiner*—Satya Sastri

(57) ABSTRACT

A low application temperature, high heat resistant hot melt adhesive comprising an ethylene vinyl acetate and/or ethylene 2-ethyl hexyl acrylate polymer having a melt index of at least 550 grams/10 minutes, a paraffin wax and a rosin derived tackifier.

19 Claims, No Drawings

HOT MELT ADHESIVE COMPOSITION

FIELD OF THE INVENTION

The invention relates to a low application temperature hot melt adhesive compositions that possess high heat resistance. The adhesive is particularly well suited for automated assembly applications, e.g., case, carton and tray manufacture.

BACKGROUND OF THE INVENTION

Hot melt adhesives are widely used for various commercial applications such as product assembly and packaging, including case sealing and carton closing operations. Such hot melt adhesives are applied to a substrate while in its molten state and cooled to harden the adhesive layer.

Most commercially available hot melt adhesives require temperatures of 350° F. (1770° C.) or greater to ensure complete melting of all the components and also to achieve a satisfactory application viscosity. The need for such elevated temperatures is not without problems. The high temperatures increase operator risks with respect both to burns and to inhalation of residual volatiles. In addition, use of high temperatures require more energy, placing greater demands on the manufacturing facility. While adhesive formulations that can be applied at temperatures below 300° F. (151° C.) can be prepared using low molecular weight components or a high wax content, application viscosity may suffer and there is a loss of adhesive properties, e.g., toughness, heat resistance and, often, specific adhesion to a substrate. While softer or more amorphous components may be added in order to improve adhesion, these components reduce the effective heat resistance.

There continues to be a need in the art for improved hot melt adhesives that can be applied at temperatures of from about 100° C. to about 135° C., have good bond strength with exceptional toughness, good heat resistance and acceptable application viscosity, even when prepared with low molecular weight components for application at a low temperature. The current invention fulfills this need.

SUMMARY OF THE INVENTION

The invention provides a hot melt adhesive comprising an ethylene vinyl acetate (EVA) polymer having a melt index (MI) of 550 grams/10 minutes or higher. Preferred embodiments will also comprise a paraffin wax, a rosin derived tackifier and, optionally, an aromatic hydrocarbon tackifier. The adhesive can be applied at a low temperature but still imparts heat stress normally associated with higher molecular weight polymers and has a longer pot life (less thermal degradation), exhibits less stringing, and is less damaging to heat sensitive substrates.

One aspect of the invention is directed to a hot melt adhesive comprising from about 20 to about 60 weight percent of at least one EVA polymer containing from about 22 to about 40% by weight of vinyl acetate and having a MI of 550 grams/10 minutes or higher, from about 20 to about 40%, more preferably from about 25 to about 35%, by weight of a paraffin wax having a melting point of from about 60 to about 68° C. and an oil content of less than about 0.5%, more preferably from about 0 to about 0.2%, from about 25 to about 60 weight % of a rosin derived tackifier and from 0 to about 35 weight % of an aromatic tackifier.

In another aspect of the invention, the EVA polymer is replaced, either in whole or in part, by an ethylene 2-ethyl hexyl acrylate (EEHA) polymer. Preferred are EEHA polymers containing from about 33 to about 40% 2-ethyl hexyl acrylate.

The rosin derived tackifiers preferred for use will generally have average softening points ranging from about 85° C. to about 130° C., more typically from about 100° C. to about 125° C., will have a weight average molecular weight greater than about 1000, will have an acid number of less than about 20 and will have a viscosity at 125° C. of greater than about 10,000 cp.

Particularly preferred compositions will comprise about 30% EVA polymer containing about 28% by weight of vinyl acetate and having a MI of about 800 grams/10 minutes, about 30% of a paraffin wax having a melting point of about 64° C. and an oil content of less than about 0.5%, and about 40% of a rosin ester having a minimum softening point of about 100° C.

The adhesives of the invention are typically formulated to have an application viscosity of between about 500 cp and 1750 cp at 120° C. The resulting compositions produce good adhesion and impart heat resistance comparable to formulations utilizing low MI EVA polymers. The compositions impart heat resistance nearly (90%) or equivalent to the melting point of the wax.

Another aspect of the invention is directed to a method of sealing and/or making or forming a case, a carton, a tray, a box or a bag. These methods comprise using a hot melt adhesive comprising an adhesive polymer, a wax and a tackifier, more specifically an adhesive polymer comprising an EVA polymer having a MI of at least about 550 grams/10 minutes.

Still another aspect of the invention is directed to an article of manufacture comprising an adhesive polymer, wax and rosin tackifier. Preferred articles include cartons, cases, trays, bags and like packaging articles used for packaging products that are formed using a hot melt adhesive comprising an EVA polymer having a MI of 550 grams/10 minutes or more, a wax and a rosin tackifier. The packaging article may comprise cardboard or paperboard that has been adhered by such hot melt adhesives. In another embodiment, the adhesive is pre-applied to the article, e.g., carton, case, tray or bag during the manufacture thereof, and prior to packaging of a product. Other articles include but are not limited to books and nonwovens such as diapers and the like.

Yet another aspect of the invention is directed to packaged articles contained within a carton, case, tray or bag, such as a packaged food, wherein the carton, case, tray or bag comprises an adhesive comprising an EVA polymer having a MI of 550 grams/10 minutes or more, a wax and a rosin tackifier.

Another aspect of the invention is directed to a process for bonding a substrate to a similar or dissimilar substrate comprising applying to at least one substrate a molten hot melt adhesive composition and bonding said substrates together, said hot melt adhesive comprising an EVA polymer having a MI of 550 grams/10 minutes or more, a wax and a rosin tackifier.

DETAILED DESCRIPTION OF THE INVENTION

All documents cited herein are incorporated in their entireties by reference.

The invention is directed to a low application temperature, high heat resistant hot melt adhesive comprising an adhesive polymer, a wax and a rosin tackifier. The adhesive of the invention is particularly well-suited for use in automated assembly applications, such as but not limited to carton, case or tray formation where the adhesive is applied from large bulk industrial melting systems where assemblies speeds can reach hundreds of units per minutes.

It has now been discovered that compositions comprising at least one adhesive polymer having a MI of at least about 550 grams/10 minutes, a wax and a rosin tackifier may be used as low application temperature hot melt adhesives that exhibit high heat resistance. Preferred for use are adhesive polymers having a MI of at least about 750 grams/10 minutes, more preferably at least about 800 grams/10 minutes.

Base adhesive polymers used in the practice of the invention include amorphous polyolefins, ethylene-containing polymers and rubbery block copolymers, as well as blends thereof, as are well known to those skilled in the art. Preferred adhesives comprise at least one ethylene copolymer, and may comprise a blend of two or more polymers. The term ethylene copolymer, as used herein, refers to homopolymers, copolymers and terpolymers of ethylene.

Examples of ethylene copolymers include copolymers with one or more polar monomers which can copolymerize with ethylene, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate and mixtures and blends thereof. Other examples include but are not limited to recycled polyethylene terephthalate and polyethylene, ethylene/α-olefin interpolymers, poly-(butene-1-co-ethylene), atactic polypropylene, low density polyethylene, homogenous linear ethylene/α-olefin copolymers, lower melt index n-butyl acrylate copolymers, ethylene vinyl ester copolymers). Random and block copolymers, as well as blends thereof may be used in the practice of the invention.

Preferred adhesives for use in the practice of the invention comprise at least one ethylene vinyl acetate polymer having a MI of at least about 550 grams/10 minutes and having a vinyl acetate content of from about 22 to about 40% by weight, as well as blends thereof. Ethylene vinyl acetate copolymers are available from DuPont Chemical Co., Wilmington, Del. under the tradename Elvax® (e.g., Elvax® 205W which has a melt index of 800 and a vinyl acetate content of about 28% by weight in the copolymer. Other ethylene vinyl acetate copolymers are available from Exxon Chemical Co. under the tradename Escorene® (e.g., UL 7505) and also from Millennium Petrochemicals, Rolling Meadows, Ill., under the tradename Ultrathene® (e.g., UE 64904) and AT® copolymers available from AT Polymers & Film Co., Charlotte, N.C. (e.g., AT® 1850M) and Evatane® from Atofina Chemicals, Philadelphia, Pa.

In another aspect of the invention, the EVA polymer may, it desired, be substituted, either in whole or in part, by an ethylene 2-ethyl hexyl acrylate (EEHA) polymer having a MI of at least about 550 grams/10 minutes. Preferred are EEHA polymers containing from about 33 to about 40% 2-ethyl hexyl acrylate.

The polymer component will usually be present in an amount of from about 20% to about 60%, more preferably from about 20% to about 40%, even more preferably from about 25% to about 35%.

Waxes suitable for use in the present invention include paraffin waxes, microcrystalline waxes, high density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, such as vinyl acetate modified and maleic anhydride modified waxes may also be used. Preferred waxes useful in the practice of the invention will have a melting point of from about 600° C. to about 64° C. and will have an oil content of less that about 0.5.

Particularly preferred are paraffin waxes having a ring and ball softening point of about 55° C. to about 85° C. Preferred paraffin waxes are Okerin® 236 TP available from Astor Wax Corporation, Doraville, Ga.; Penreco® 4913 available from Pennzoil Products Co., Houston, Tex.; R-7152 Paraffin Wax available from Moore & Munger, Shelton, CN.; and Paraffin Wax 1297 available from International Waxes, Ltd in Ontario, Canada. Particularly preferred are paraffin waxes having melting points in the range of about 130 to 165° F., such as, for example, Pacemaker available from Citgo, and R-2540 available from Moore and Munger; and low melting point synthetic Fischer-Tropsch waxes having a melting point of less than about 180° F. The most preferred wax is paraffin wax with a melting point of 150° F. Other paraffinic waxes include waxes available from CP Hall under the product designations 1230, 1236, 1240, 1245, 1246, 1255, 1260, & 1262. CP Hall 1246 paraffinic wax is available from CP Hall (Stow, Ohio).

Rosin tackifier and rosin derived tackifier are used interchangeable herein to refer to rosin tackifiers, modifications and derivatives thereof and combinations thereof.

Rosin derived tackifiers preferred for use are those having average softening points ranging from about 85° C. to about 130° C., more typically from about 100° C. to about 125° C., and having a weight average molecular weight greater than about 1000, an acid number of less than about 20 and a viscosity at 1250° C. of greater than 10,000 cp.

Whether a particular rosin tackifier has the preferred molecular weight and softening point can be easily determined by the skilled practitioner. The molecular weight average, Mw, is measured by dissolving the material in a suitable solvent, e.g., tetrahydrofuran, and subjecting a sample of that solution to Gel Permeation Chromatography (GPC) analysis. The retention time and elutlon profile of polystyrene standards of known molecular weight (commercially available from many Chromatography supply houses, e.g., Supelco, Inc. or Waters Associates) provides weight average molecular weight data in grams/mole. The softening point is measured by a Mettler FP90 Central Processor and a Mettler FP83 HT Dropping Point cell with a softening point ring, and are reported in degrees centigrade (°C.).

Rosins useful as tackifiers may be any standard material of commerce known as "rosin", or a feedstock containing rosin. Rosin is mainly a mixture of $C_{20}$, tricyclic fused-ring, monocarboxylic acids, typified by pimaric and abietic acids, which are commonly referred to as "resin acids." Any one or more of the $C_{20}$ cyclic carboxylic acid-containing isomers present in rosin may be used.

Suitable rosins can be obtained from many sources, and can have a wide range of purities. For example, wood rosin may be used, where wood rosin is obtained from Pinus stumps after harvesting the stumps, chipping the stumps into small chips, extracting the chips with hexane or higher-boiling paraffin, and distilling the hexane or paraffin to yield wood rosin. Gum rosin, which is the name given to rosin that is obtained after scoring a pine tree, collecting the exudate sap, and then distilling away the volatile components, may also be used. The rosin may be tall oil rosin, which is a by-product of the Kraft (i.e., sulfate) pulping process for making paper. According to the Kraft process, pinewood is digested with alkali and sulfide, producing tall oil soap and crude sulfate turpentine as by-products. Acidification of this soap followed by fractionation of the crude tall oil yields tall oil rosin and fatty acids. Depending on the fractionation conditions, the rosin may contain variable amounts of fatty acids. Preferably, the rosin used in the present invention contains at least 90 wt % resin acids, and less than 10 wt % fatty acids. Some rosin dimerization product, which may form during the fractionation process, may also be present in the tall oil rosin. A standard grade of rosin is available commercially from Union Camp Corporation (Wayne, N.J.) under the UNITOL® trademark. Gum rosin, including Chinese gum rosin, is another rosin which can be used to prepare modified rosins for use in the practice of the invention esters of the invention.

Essentially any reaction conditions recognized in the art for preparing modified rosin phenolic resins (including derivatives thereof) may be employed to prepare a modified rosin for use in the present invention. Phenolic-modified rosin esters are typically prepared by the reaction of rosin and a phenolic compound. This phenolic resin is then esterified with a polyhydric alcohol providing phenolic-modified rosin esters. Typically, the combinations of reactants are exposed to an elevated temperature In the range of 100–3000° C. At these elevated temperatures, the reactants undergo covalent bond-forming reactions with other reactants, so that a resinous material is formed. Reaction products of rosins and their methods of preparation are well known in the art. See, e.g., U.S. Pat. No. 2,007,983. Rosin esters (made without phenol) are also used in the practice of the invention.

Useful tackifying resins may Include any compatible resin or mixtures thereof such as natural and modified rosins including, for example, as gum rosin, wood rosin, tall oil rosin, distilled rosin, hydrogenated rosin, dimerized rosin, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styreneaterpene and alpha methyl styrenetterpene; polyterpene resins having a softening point, as determined by ASTM method E28-58T, of from about 80° C. to 150° C.; phenolic modified terpene resins and hydrogenated derivatives thereof including, for example, the resin product resulting from the condensation, in an acidic medium, of a bicyclic terpene and a phenol; aliphatic petroleum hydrocarbon resins having a Ball and Ring softening point of from about 70° C. to 135° C.; aromatic petroleum hydrocarbon resins and the hydrogenated derivatives thereof; and alicyclic petroleum hydrocarbon resins and the hydrogenated derivatives thereof. Mixtures of two or more of the above described tackifying resins may be required for some formulations. Also included are the cyclic or acyclic $C_5$ resins and aromatic modified acyclic or cyclic resins.

Commercially available rosins that can be used to practice the invention include Sylvares RE 115, available from Arizona Chemical and Sylvares RE 104, available from Arizona Chemical.

The rosin tackifier component will typically be used in amounts of from about 10 to about 60 weight percent, more preferably from about 33 to about 45 weight %, by weight of the adhesive composition.

The adhesives may desirably contain up to about 35 weight % of an aromatic tackifier. Preferred aromatic tackifiers are thermoplastic hydrocarbon resins derived from styrene, alpha-methylstyrene, and/or vinyltoluene, and polymers, copolymers and terpolymers thereof, terpenes, terpene phenolics, modified terpenes, and combinations thereof. KRYSTALEX 3100 is a low molecular weight thermoplastic hydrocarbon polymer derived largely from alphamethylstryene which has a Ring and Ball softening point of 97 to 103° C. and is commercially available from Hercules Inc.

The adhesives of the present invention may also contain a stabilizer or antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2,4,6-tris-(3,5-di-tert-butyl-4-hydroxybenzyl)-benzene; pentaerythrityl tetrakis-3(3,5-di-tert-butyl-4-hydroxyphenyl)-proplonate; n-octadecyl-3(3,5-di-tert-butyl-4-hydroxyphenyl)-propionate; 4,4'-methylenebis (2,6-tert-butyl-phenol); 4,4'-thiobis (8tert-butyl-o-cresol); 2,6-di-n-tertbutylphenol; 6-(4-hydroxyphenoxy)-2,4-bis(n-octyl-thio)- 1,3,5 triazine; di-n-octylthio)ethyl 3,5-di-tert-butyl-4-hydroxy-benzoate; and sorbitol hexa[3-(3,5di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

Such antioxidants are commercially available from Ciba-Geigy, Hawthome, N.Y. and include Irganox® 565, 1010 and 1076 which are hindered phenols. These are primary antioxidants which act as radical scavengers and may be used alone or in combination with other antioxidants such as phosphite antioxidants like Irgafos(168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

The adhesive compositions of the present invention are prepared by blending the components in the melt at a temperature of above about 1209° C., typically at about 150° C. until a homogeneous blend is obtained, usually about two hours is sufficient. Various methods of blending are known in the art and any method that produces a homogeneous blend is satisfactory.

The resulting adhesives are characterized by a viscosity at 120° C. of between about 500 cp and about 1750 op. They may be applied low temperatures to provide superior adhesive bonds even when exposed to a wide variety of temperature conditions. By low application temperature means that the adhesive is applied at temperatures below about 150° C., preferable below about 140° C., more preferably below about 135° C. The adhesives possess excellent heat resistance and cold resistance. High heat resistance means the ability to maintain a fiber tearing bond at elevated temperatures of about 1402° F.

The hot melt adhesives of the invention find use in, for example, packaging, converting, bookbinding, bag ending and in the nonwovens markets. The adhesives find particular use as case, carton, and tray forming, and as sealing adhesives, including heat sealing applications, for example in the packaging of cereals, cracker and beer products. Encompassed by the invention are containers, e.g., cartons, cases, boxes, bags, trays and the like, When the adhesive is applied by the manufacturer thereof prior to shipment to the package the container is heat sealed following packaging.

The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum toil which is further laminated to film materials such as polyethylene, Mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

In the following examples, which are provided for illustrative purposes only, all parts are by weight and all temperatures in degrees Celsius unless otherwise noted.

EXAMPLE

Melt viscosities of the hot melt adhesives were determined on a Brookfield Model RVT Thermosel viscometer using a number 27 spindle.

Acid number was measured by techniques known in the art. See, e.g., ASTM D-465 (1982).

Softening points were measured with a Mettler FP90 Central Processor and a Mettler FP83 HT Dropping point cell with a softening point ring, and are reported below in degrees centigrade (° C.). A heating rate of between about 1° C. and about 2° C. per minute was used.

Heat stress was measured by forming a composite construction of adhesive (2×½" compressed) between two pieces of corrugated paperboard of specific dimensions. The adhesive bead forming this composite is then placed under approximately 2 pounds of cantilever stress for 24 hours at elevated temperatures. The maximum temperature at which this construction remains in tact for at least 24 hours is then noted.

Example 1

Adhesive samples having the compositions shown in Table 1 where prepared.

TABLE 1

| | Sample 1 | Sample 2 | Sample 3 | Sample 4 | Sample 5 | Sample 6 |
| --- | --- | --- | --- | --- | --- | --- |
| EVA 28% VA MI 800 g/10 min. | 29.9 | 30 | 30 | 30 | 30 | 30 |
| EVA 28% VA MI 2500 g/10 min | | | 5 | | | |
| Polymer rosin SP 125° C. | | | | | 39.8 | |
| Rosin ester SP 117° C. | 26 | 39.8 | 34.8 | | | |
| Rosin ester SP 100° C. | | | | | | 39.8 |
| Rosin ester SP 104° C. | | | | 39.8 | | |
| Aromatic hydrocarbon | 14 | | | | | |
| Paraffin wax | 30 | 30 | 30 | 30 | 30 | 30 |
| Antioxidant | 0.1 | 0.2 | 0.2 | 0.2 | 0.2 | 0.2 |

The adhesive formulations were prepared using the following equipment: a bench top heating mantle; single blade mixing shaft; electric variable speed motor; quart sized cans; and electronic temperature controller. The adhesives were prepared in 200 gram batches, according to the formulations set forth in Table 1. The quantities recited in Table 1 refer to parts by weight of each component based on ~100 parts used to prepare the formula.

The adhesives were compounded by first adding all the wax (paraffinic), antioxidant (IRGANOX 1010) and polymer (e.g., ENABLE) to the quart sized can. The can was placed In a glascol heating mantle and allowed to heat up to 150° C. with constant agitation from the mixer. As soon as the solid materials melted and appeared homogeneous at 150° C., the resin was slowly added. The resins (rosin phenolic or rosin ester) were added slowly so as not to agglomerate together or lower the mixing temperature too severely. Once the resins were completely dissolved and had been thoroughly mixed, the adhesive was poured out into 8 ounce jars and allowed to cool. The total time for the adhesive preparation was ~1 to 3 hours for the material to be homogeneous. However if the material did not appear homogeneous and clear but cloudy, another additional 45 minutes of mix time was allowed at 165° C. If the sample was still cloudy and hazy, the mixing was stopped and the sample poured out and still tested.

Adhesive properties of the formulations shown in Table 1 were analyzed. The results are shown in Table 2.

TABLE 2

|  | Sample 1 | Sample 2 | Sample 3 | Sample 4 | Sample 5 | Sample 6 |
|---|---|---|---|---|---|---|
| Viscosity, 130° C. | — | 688 | 972 | 620 | 810 | 628 |
| Heat stress, Ave. ° C. | 62.5 | 61.8 60.3 60.3 | 60.3 | 55.0 | 59.5 | 58.6 |

Adhesives of the invention have good machining characteristics making these adhesives useful in applications requiring high throughput such as automated packaging operations. High heat stress is shown.

Many modifications and variations of this invention can be made without departing from its spirit and scope. as will be apparent to those skilled in the art. The specific embodiments described herein are offered by way of example only, and the invention is to be limited only by the terms of the appended claims, along with the full scope of equivalents to which such claims are entitled.

What is claimed is:

1. A high heat resistant, low application temperature hot melt adhesive comprising an ethylene vinyl acetate copolymer and/or ethylene 2-ethyl hexyl acrylate copolymer having a melt index of at least 550 grams/10 minutes, a paraffin wax and a rosin derived tackifier, said tackifier being present in amounts greater than 25 weight % to about 60 weight %.

2. The adhesive of claim 1 wherein the adhesive has a viscosity of about 500 cp to about 1750 cp at 120° C.

3. The adhesive of claim 1 wherein the adhesive polymer has a melt index of at least 750 grams/10 minutes.

4. The adhesive of claim 1 wherein the tackifier has an average softening point of from about 100° C. about 125° C., a weight average molecular weight greater than 1000, an acid number less than 20 and a viscosity at 125° C. greater than about 10,000 cp.

5. The adhesive of claim 1 which comprises from about 20 to about 60 weight percent of at least one ethylene vinyl acetate polymer containing from about 22 to about 40 % by weight of vinyl acetate and having a MI of 550 grams/10 minutes or higher, from about 20 to about 40 weight percent of a paraffin wax having a melting point of from about 60° C. to about 65° C. and an oil content of less an about 0.5%, up to about 60 weight % of said rosin derived tackifier and from 0 to about 35 weight % of an aromatic tackifier.

6. The adhesive of claim 5 comprising about 30% of ethylene vinyl acetate polymer containing about 28% by weight of vinyl acetate and having a melt index of about 800 grams/10 minutes, about 30% of a paraffin wax having a melting point of about 64° C. and an oil content of less than about 0.5%, and about 40% of a rosin ester having a minimum softening point of about 100° C.

7. An article of manufacture comprising the adhesive of claim 1.

8. The article of claim 7 wherein the adhesive comprises from about 20 to about 60 weight percent of at least one ethylene vinyl acetate polymer containing from about 22 to about 40 % by weight of vinyl acetate and having a MI of 550 grams/10 minutes or higher, from about 20 to about 40 weight percent of a paraffin wax having a melting point of from about 60° C. to about 65° C. and an oil content of less than about 0.5%, up to about 60 weight % of said rosin derived tackifier and from 0 to about 35 weight % of an aromatic tackifier.

9. The article of claim 8 which is a carton, case, tray, bag or book.

10. A method of sealing and/or forming a case, carton, tray, bag or book comprising applying the hot melt adhesive of claim 1 to seal and/or form the case, carton, tray, bag or book.

11. A packaged article contained within a carton, case, tray or bag, wherein the carton, case, tray or bag comprises the adhesive of claim 1.

12. The packaged article of claim 11 which is a packaged food article.

13. A process for bonding a substrate to a similar or dissimilar substrate comprising applying to at least one substrate a molten hot melt adhesive composition and bonding said substrate together, wherein said hot melt adhesive is a high heat resistant, low application temperature hot melt adhesive comprising an ethylene vinyl acetate copolymer and/or ethylene 2-ethyl hexyl acrylate copolymer having a melt index of at least 550 grams/10 minutes, a paraffin wax and a rosin derived tackifier and having a viscosity of about 500 cp to about 1750 cp at 120° C., wherein said tackifier is present in amounts greater than then 25 weight % to about 60 weight %.

14. The adhesive of claim 5 comprising from about 33 to about 45 weight % of said rosin derived tackifier.

15. The article of claim 8 wherein said adhesive comprises from about 33 to about 45 weight % of said rosin derived tackifier.

16. The method of claim 10 wherein said adhesive comprises from about 33 to about 45 weight % of said rosin derived tackifier.

17. The process of claim 13 wherein said adhesive comprises from about 33 to about 45 weight % of said rosin derived tackifier.

18. A high heat resistant, low application temperature hot melt adhesive comprising an ethylene 2-ethyl acrylate copolymer, a paraffin wax and a rosin derived tackifier.

19. The adhesive of claim 1 comprising ethylene vinyl acetate copolymer, ethylene 2-ethyl hexyl acrylate copolymer and from about 33 to about 60 weight % of said rosin derived tackifier.

* * * * *